United States Patent [19]
Miller

[11] 3,968,364
[45] July 6, 1976

[54] HEIGHT SENSING DEVICE
[75] Inventor: Eugene F. Miller, Dallas, Tex.
[73] Assignee: Xerox Corporation, Stamford, Conn.
[22] Filed: Aug. 27, 1975
[21] Appl. No.: 608,116

[52] U.S. Cl. .................. 250/237 R; 250/231 R; 250/561
[51] Int. Cl.² ............................................ H01J 3/14
[58] Field of Search ........... 250/231, 237, 560, 561, 250/229, 239

[56] References Cited
UNITED STATES PATENTS
| | | | |
|---|---|---|---|
| 3,775,617 | 11/1973 | Dubauskas | 250/237 R |
| 3,887,806 | 6/1975 | Rodak et al | 250/231 R |
| 3,889,111 | 6/1975 | Moss | 250/561 |

Primary Examiner—Alfred E. Smith
Assistant Examiner—D. C. Nelms
Attorney, Agent, or Firm—Sheldon F. Raizes

[57] ABSTRACT

A height sensing device is provided which comprises a beam interrupter which swings into and out of the path of a beam passing from a light source to a photodiode. The beam interrupter is a disc rotatably mounted on a swinging sensor. The disc has a slot eccentrically located about the rotational axis of the disc. For adjustment, the disc may be rotated relative to the sensor to bring a portion of the slot into the beam path and then locked in such a position onto the sensor.

10 Claims, 5 Drawing Figures

U.S. Patent   July 6, 1976   3,968,364
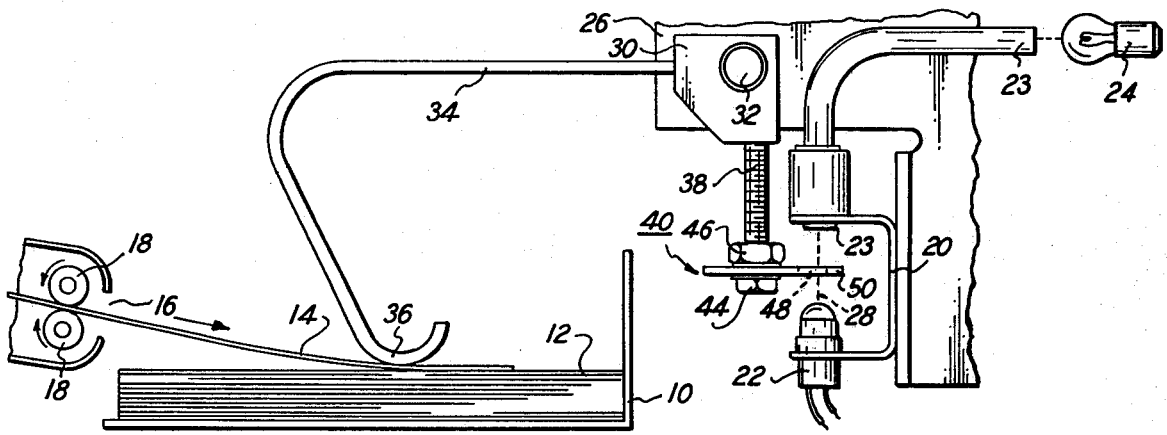
FIG. 1
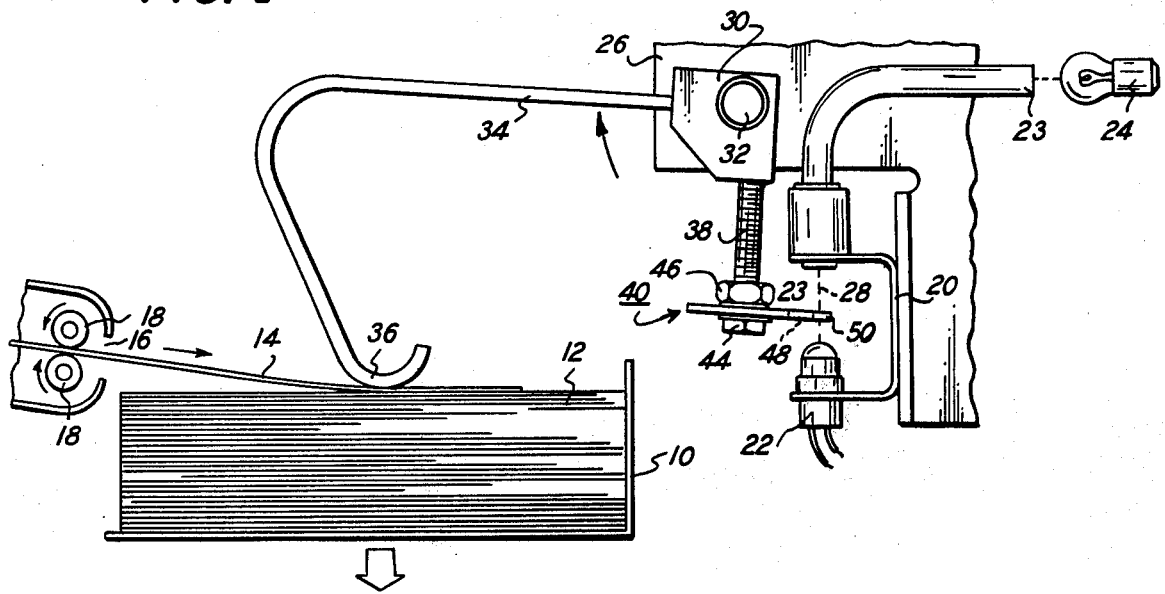
FIG. 2
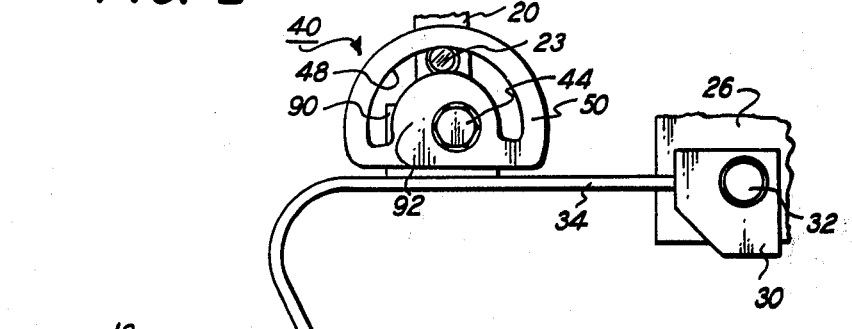
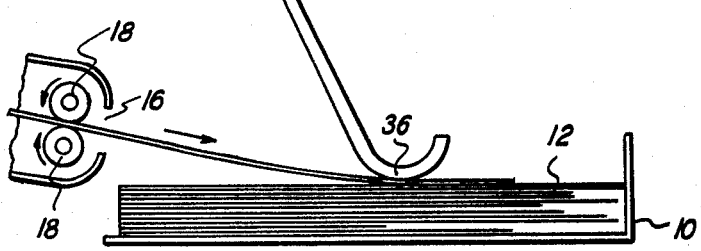
FIG. 4
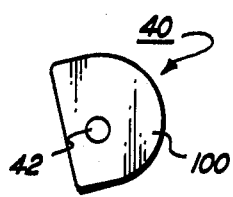
FIG. 3
FIG. 5

3,968,364

HEIGHT SENSING DEVICE

DESCRIPTION OF THE INVENTION

In the environment of this invention, a height sensing device is utilized in combination with a copier sheet stacker wherein sheets of paper are fed from a stationary outlet onto a tray which is capable of lowering as the stack height increases. The sensing device senses the level of the stack relative to the outlet and when the stack is too high, actuates a motor to lower the tray to keep a substantially constant relationship between the levels of the top of the stack and of the outlet. A commonly utilized height sensing device comprises a photodiode which normally receives a beam from a light source indicating a stable condition. A beam interrupter breaks the beam when a given stack height relative to the outlet is reached whereby signals are sent from the photodiode to actuate a motor to lower the tray. The photodiode and the light source are carried on a common bracket. To align the beam with the beam interrupter, one slides the bracket on its support. However, this type of adjustment is cumbersome as it is difficult to slide a bracket in minute increments.

It is, therefore, an object of this invention to provide a photosensitive height sensing device with a beam interrupter that is readily adjustable in minute increments to align the same with a beam directed to a photosensitive cell.

Other objects of the invention will become apparent from the following description with reference to the drawing wherein:

FIG. 1 is a side view of a sheet stacker and a height sensing device illustrating the height sensing device in a beam passing position;

FIG. 2 is a view similar to FIG. 1 illustrating the height sensing device in a beam interrupting position;

FIG. 3 is a view of a beam interrupter utilized on the height sensing device of FIGS. 1 and 2.

FIG. 4 is a view similar to FIG. 1 illustrating a modification of the embodiment of FIG. 1; and FIG. 5 is a view of a modified beam interrupter.

Referring to FIG. 1, a vertically movable elevator tray 10 is provided to receive a stack 12 of copy sheets 14 being discharged through a copying machine outlet 16 by a pair of rotating nip rolls 18. The tray is mounted on a frame (not shown) in a manner to be moved vertically upwards or downwards. A motor (not shown) is operatively connected to the tray 10 for moving the same in the desired vertical direction. As the sheets 14 are discharged onto the tray 10, the tray will be lowered in small increments to keep the same relative relationship between the levels of the top of stack 12 and the outlet 16. This elevator tray mechanism is well known and is presently on the commercially available Xerox 1200 computer printers.

A U-shaped bracket 20 carries a photodiode 22 on one leg and one end of a fiber optic 23 on the other leg. The other end of the fiber optic 23 is exposed to a light source 24. The bracket 20 is secured to a stationary support 26. The photodiode 22 is aligned with a beam 28 generated by the light source 24. The photodiode is connected to a switch (not shown) to open or close the same to control power to the tray motor for actuating or shutting off the same. The circuitry is such that when the beam is interrupted, the switch wll close to supply power to the motor to lower the tray and when the beam 28 strikes the photodiode, the switch will open thereby stopping the motor. As long as the beam 28 strikes the photodiode, the tray will remain in a stable position.

A block 30 is rotatably mounted on a shaft 32 which is also mounted on the stationary support 26. A sensing arm 34 is secured at one end to the block 30 by any well-known means (such as soldering). The other or sensing end 36 of the sensing arm 34 rests on the stack 12 of copy sheets and is curved to allow sheets 14 discharged through opening 16 to pass therebeneath and thereby be added to the stack 12.

A Nylon pellet self-locking threaded screw 38 is threadedly connected to the block 30. A beam interrupter disc 40 slidably receives the bolt 30 through opening 42 which is slightly larger in diameter than the threaded portion of the screw 38. The screw 38 has an enlarged flanged head 44 against which the disc 40 rests. A nut 46 is threaded onto the screw 38 and may be tightened to press the disc 40 against the flanged head 44 to prevent rotation of the disc relative to the screw 38. The disc has a slot 48 which is eccentrically located about the opening 42 and is wide enough to pass a sufficient amount of light to the photodiode to activate the same.

To align a portion of the slot 48 with the beam 28, the arm 34 is rested on the tray 10 at the uppermost sheet receiving position of the tray. The disc 40 is rotated by turning the self-locking screw 38 until the beam 28 psses through the slot to activate the photodiode 22. This sets the beam interrupter disc at a tray stable position. Since the screw 38 is self-locking, the disc is locked into aligned position. Due to the eccentric slot 48, the disc 40 may be rotated a significant amount while only slightly changing the position of the slot 48 relative to the path of beam 28. This permits adjustment in minute increments. As the paper stack increases in height, the arm 34 will be raised causing block 30 to rotate in a clockwise direction which in turn causes the disc to move thereby bringing the slot 48 out of the path of the beam and bringing a solid portion 50 into the path of the beam to interrupt the same. This will cause the motor to lower the tray 10 until the slot 48 is moved back into the path of the beam 28 resulting in shutting off the motor.

The location of the beam interrupter disc may be changed from the location illustrated in FIGS. 1 and 2 to that shown in FIG. 4 wherein the disc is located between the pivotal axis 32 of the sensing arm 34 and the sensing end 36 thereof. In this embodiment the self-locking screw 38 is threaded into a block 90 welded to the arm 34. The beam passing between the fiber optic 23 and the photodiode (not shown) is parallel to the pivotal axis 32. The portion 92 of the disc 40 will interrupt the beam when the arm 34 is pivoted.

Referring to FIG. 5, disc 40 may be modified by constructing it as a solid member with portion 100 being arranged eccentrically around the opeing 42. The solid portion 100 will normally be interposed in the path of the beam 28 and withdrawn from the path when the arm 34 is rotated due to increasing level of the stack 12 relative to the opening 16. In this situation, the circuitry will be such that the tray motor will be in stable condition when the beam is interrupted and will be actuated when the photodiode sees the beam.

What is claimed is:

1. In a height sensing mechanism: a support, a light source and a light detector aligned with said source each fixed to said support, a sensing member pivotally mounted to said support, a beam interrupter rotatably mounted to said sensing member for rotation relative thereto, said beam interrupter having a slot therein eccentrically located about the axis of the rotational connection of said beam interrupter to said sensing member, sensing means on said sensing member, said beam interrupter being located between said light source and aid detector, and means for locking said beam interrupter in a position on said sensing member that a portion of said slot is aligned with said light source and said detector to allow a beam generated by said light source to pass therethrough at only a predetermined pivotal position of said sensing member relative to said support.

2. The structure as recited in claim 1 wherein the rotational axis of said beam interrupter is generally perpendicular to the pivotal axis of said sensing member and the path of alignment of said light source and detector is in the same general direction as the rotational axis of said beam interrupter.

3. The structure as recited in claim 1 wherein the rotational axis of said beam interrupter is generally parallel to the pivotal axis of said sensing member and the path of alignment of said light source and detector is in the same general direction as the rotational axis of said beam interrupter.

4. The structure as recited in claim 1 wherein the pivotal axis of said sensing member is located between said beam interrupter and said sensing means.

5. The structure as recited in claim 1 wherein said beam interrupter is located between the pivotal axis of said sensing member and said sensing means.

6. In a height sensing mechanism: a support, a light source and a light detector aligned with said source each fixed to said support, a sensing member pivotally mounted to said support, a beam interrupter rotatably mounted to said sensing member for rotation relative thereto, said beam interrupter having a solid area eccentrically located about the axis of the rotational connection of said beam interrupter to said sensing member, sensing means on said sensing member, said beam interrupter being located between said light source and said detector, and means for locking said beam interrupter in a position on said sensing member such that a portion of said solid area is aligned with said light source and said detector in the path of a beam generated by said light source to prevent the same from passing to said detector at a predetermined pivotal position of said sensing member relative to said support and said portion of said solid area is withdrawn from the beam path to allow the beam generated by said light source to pass to said detector at a different predetermined pivotal position of said sensing member relative to said support.

7. The structure as recited in claim 6 wherein the rotational axis of said beam interrupter is generally perpendicular to the pivotal axis of said sensing member and the path of alignment of said light source and detector is in the same general direction as the rotational axis of said beam interrupter.

8. The structure as recited in claim 6 wherein the rotational axis of said beam interrupter is generally parallel to the pivotal axis of said sensing member and the path of alignment of said light source and detector is in the same general direction as the rotational axis of said beam interrupter.

9. The structure as recited in claim 6 wherein the pivotal axis of said sensing member is located between said beam interrupter and said sensing means.

10. The structure as recited in claim 6 wherein said beam interrupter is located between the pivotal axis of said sensing member and said sensing means.

* * * * *